US012092543B2

(12) United States Patent
Nie et al.

(10) Patent No.: US 12,092,543 B2
(45) Date of Patent: Sep. 17, 2024

(54) THREE-DIMENSIONAL FORCE FLEXIBLE TACTILE SENSOR AND PREPARATION METHOD AND DECOUPLING METHOD THEREOF

(71) Applicant: SOOCHOW UNIVERSITY, Suzhou (CN)

(72) Inventors: Baoqing Nie, Suzhou (CN); Jian Liu, Suzhou (CN); Xinjian Chen, Suzhou (CN); Jialei Geng, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 350 days.

(21) Appl. No.: 17/631,479

(22) PCT Filed: Jan. 22, 2021

(86) PCT No.: PCT/CN2021/073336
§ 371 (c)(1),
(2) Date: Jan. 30, 2022

(87) PCT Pub. No.: WO2022/116383
PCT Pub. Date: Jun. 9, 2022

(65) Prior Publication Data
US 2022/0349764 A1     Nov. 3, 2022

(30) Foreign Application Priority Data

Dec. 2, 2020 (CN) .......................... 202011390552.X

(51) Int. Cl.
*G01L 5/165* (2020.01)
(52) U.S. Cl.
CPC .................................... *G01L 5/165* (2013.01)
(58) Field of Classification Search
CPC .......... G01L 5/165; G01L 1/142; G01L 1/146

USPC ........ 73/862.041–862.43, 862.046, 862.626, 73/718, 724; 29/595; 361/283.1, 280;
(Continued)

(56) References Cited

U.S. PATENT DOCUMENTS

2019/0140283 A1\*  5/2019  Fukatani ................. H01M 4/13
2019/0391651 A1   12/2019  Chowdhury et al.
2022/0061713 A1\*  3/2022  Martinez .............. A61B 5/0002

FOREIGN PATENT DOCUMENTS

| CN | 101738275 A | 6/2010 |
| CN | 110082012 A | 8/2019 |

OTHER PUBLICATIONS

Ting Yao, "Research on highly sensitive and flexible fingertip tactile sensing technology" Soochow University, Master Degree's Thesis (Apr. 15, 2020).

\* cited by examiner

*Primary Examiner* — Robert R Raevis
(74) *Attorney, Agent, or Firm* — SZDC Law PC

(57) ABSTRACT

The invention provides a three-dimensional force flexible tactile sensor and a fabrication method and a decoupling method thereof. The three-dimensional force flexible tactile sensor includes a first flexible layer, a porous elastic layer and a second flexible layer which are arranged in sequence. The first flexible layer is provided with a plurality of first electrodes. The second flexible layer is provided with a second electrode. The first electrodes and the second electrode are both clung to the porous elastic layer. The sensor not only can detect normal mechanical load, but also can measure the force tangent to the surface of the sensor, thereby realizing the detection of the three-dimensional force.

12 Claims, 5 Drawing Sheets

(58) Field of Classification Search
USPC .... 427/457, 487, 522, 592, 58, 79, 81, 96.9, 427/98.8
See application file for complete search history.

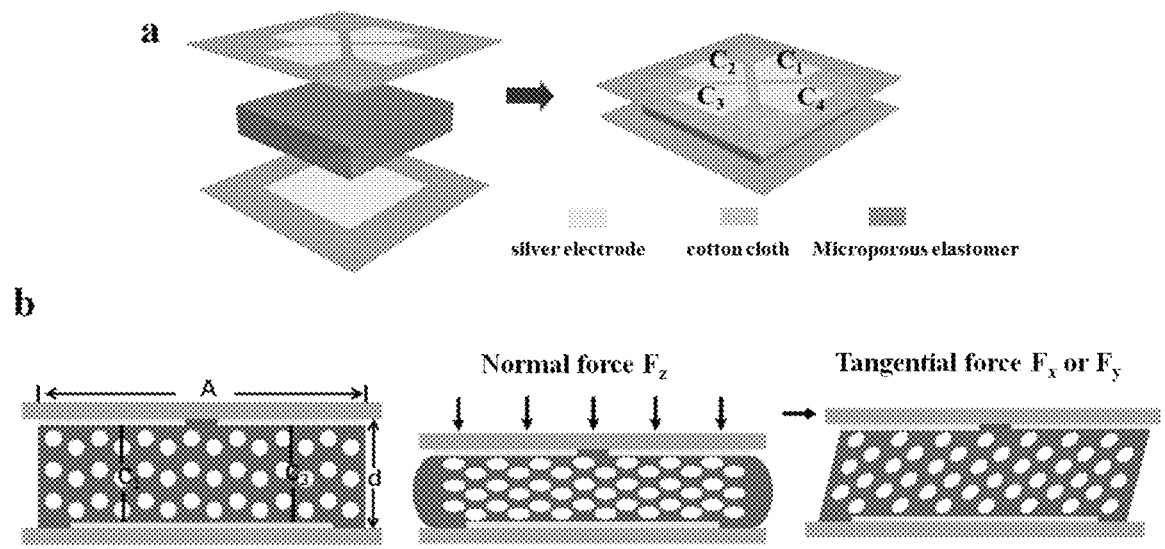
FIG. 1
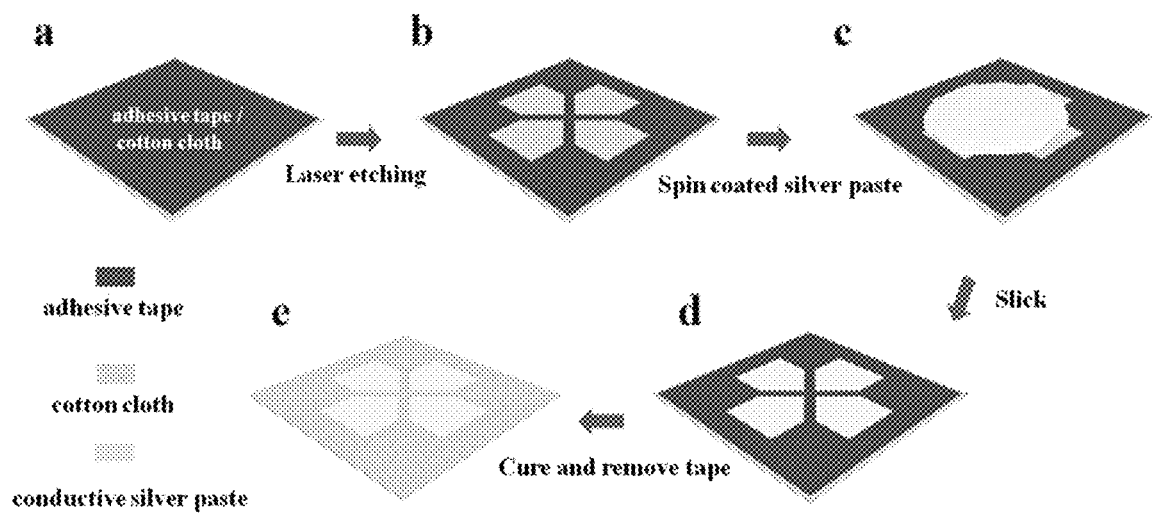
FIG 2.1

FIG 2.2

THREE-DIMENSIONAL FORCE FLEXIBLE TACTILE SENSOR AND PREPARATION METHOD AND DECOUPLING METHOD THEREOF

This application is the National Stage Application of PCT/CN2021/073336, filed on Jan. 22, 2021, which claims priority to Chinese Patent Application No. 202011390552.X, filed on Dec. 2, 2020, which is incorporated by reference for all purposes as if fully set forth herein.

FIELD OF THE INVENTION

The present invention relates to the technical field of flexible sensors, and more particularly to a three-dimensional force flexible tactile sensor and a preparation method and a decoupling method thereof.

DESCRIPTION OF THE RELATED ART

With the development of artificial intelligence, there is an increasing demand for flexible electronic devices, including flexible sensors, wearable energy generators, wearable organic diodes, soft robots, etc. In such state-of-the-art electronic devices, many flexible sensors are required not only to detect the normal force/pressure on the sensor surface, but also to sense the tangential load.

Currently, the three-dimensional load can be detected by using many sensing principles, including piezoelectric, resistive, capacitive, and optical technologies. As one of the most commonly used methods, the resistive three-dimensional force sensor is composed of electrically conductive rubber or metal and other electrically conductive sensing elements. Its working principle is that when the sensor receives an external force, the built-in electrically conductive unit is caused to compress or stretch, so that the local resistance is changed correspondingly. However, this method still has many technical limitations, including complex structural design, thermal changes and crosstalk between sensing pixels. The capacitive sensor has led another trend in the development of three-dimensional force sensors due to its high sensitivity, excellent linearity, low power consumption and thermal noise resistance.

The study of flexible sensors is encountered with the following problems: on one hand, lack the methodology to decouple the forces in arbitrary directions, and the sensitivity is poor or unstable; on the other hand, the decoupling method of the sensor is complicated and has a large decoupling error.

SUMMARY OF THE INVENTION

The technical problem to be solved by the present invention is to provide a three-dimensional force flexible tactile sensor and a fabrication method and a decoupling method thereof. The sensor not only can detect normal mechanical load, but also can measure the force tangent to the surface of the sensor, thereby realizing the detection of the three-dimensional force.

In order to solve the above technical problems, the present invention provides a three-dimensional force flexible tactile sensor, including a first flexible layer, a porous elastic layer and a second flexible layer which are arranged in sequence. The first flexible layer is provided with a plurality of first electrodes. The second flexible layer is provided with a second electrode. The first electrodes and the second electrode are both clung to the porous elastic layer.

Preferably, the first flexible layer is fabric, plastic or polymer film.

Preferably, four first electrodes are provided.

Preferably, the porous elastic layer is made of Ecoflex or PDMS.

The invention also provides method for fabricating a three-dimensional force flexible tactile sensor, including the following steps:

S1, preparing a plurality of first electrodes on the first flexible layer to obtain a first electrode/flexible composite layer; preparing a second electrode on the second flexible layer to obtain a second electrode/flexible composite layer;

S2, preparing a solution of a porous elastomer;

S3, by using the second electrode/flexible composite layer as a substrate, pouring the solution of the porous elastomer on the second electrode/flexible composite layer, and covering with the first electrode/flexible composite layer; and S4, solidifying the solution of the porous elastomer between the first electrode/flexible composite layer and the second electrode/flexible composite layer by curing to obtain a flexible sensor.

Preferably, in the step S1, the preparing a plurality of first electrodes on the first flexible layer to obtain a first electrode/flexible composite layer including the following steps:

adhering an adhesive layer to one side of the first flexible layer, and etching the adhesive layer to obtain a receiving groove;

filling an electrically conductive slurry in the receiving groove, and heating to solidify the electrically conductive slurry; and removing the adhesive layer to obtain the first electrode/flexible composite layer.

Preferably, the electrically conductive slurry is a conductive silver paste or conductive polymer.

Preferably, in the step S2, the preparing a solution of a porous elastomer includes the following steps:

mixing sodium dodecylsulfate and lithium sulfate into deionized water to obtain a mixture; and mixing the mixture with a high molecular polymer to obtain the solution of the porous elastomer.

Preferably, the high molecular polymer is Ecoflex-0030.

Preferably, a mold is further provided, the mold includes a first sub-mold and a second sub-mold, the first sub-mold cooperates with the second sub-mold to form a cavity, and the step S3 includes:

placing the mold on the second electrode/flexible composite layer, filling the cavity of the mold with the solution of the porous elastomer, and then covering with the first electrode/flexible composite layer.

The present invention further provides a decoupling method for the above three-dimensional force flexible tactile sensor, including the following steps:

constructing a relational expression of a force received by the sensor and capacitance of the sensor:

$$\begin{bmatrix} \Delta C_1/C_1^0 \\ \Delta C_2/C_2^0 \\ \Delta C_3/C_3^0 \\ \Delta C_4/C_4^0 \end{bmatrix} = A \begin{bmatrix} F_x & F_y & F_x^2 & F_y^2 & F_xF_z & F_yF_z \end{bmatrix},$$

wherein $C_n^0$, is an initial capacitance value between the first electrode and the second electrode, $\Delta C_n$ is an absolute change of a corresponding capacitance unit, $F_x$, $F_y$, and $F_z$ are components of a three-dimensional force, and n=1, 2, 3, 4;

detecting the initial capacitance values $C_1^0$, $C_2^0$, $C_4^0$, and $C_4^0$ between the first electrodes and the second electrode;

applying a three-dimensional force F' to the sensor, and based on the components Fx', Fy', and Fz' of the three-dimensional force F' which are known, obtaining the absolute changes ΔC1', ΔC2', ΔC3' and ΔC4' of the capacitances formed by the first electrodes and the second electrode;

changing the magnitude and direction of the three-dimensional force F' to obtain m sets of sample data, wherein each set of sample data includes $F_x'$, $F_y'$, and $F_z'$ under the three-dimensional force and the absolute changes ΔC1', ΔC2', ΔC3' and ΔC4' in capacitance of the sensor;

fitting the m sets of sample data according to a least squares method to obtain a matrix coefficient A', and obtain an updated relational expression of the force received by the sensor and the capacitance of the sensor:

$$\begin{bmatrix} \Delta C_1/C_1^0 \\ \Delta C_2/C_2^0 \\ \Delta C_3/C_3^0 \\ \Delta C_4/C_4^0 \end{bmatrix} = A'\begin{bmatrix} F_x & F_y & F_x^2 & F_y^2 & F_xF_z & F_yF_z \end{bmatrix};$$

and applying an unknown test force $F_{measured}$ to the sensor, measuring absolute changes $\Delta C1_{measured}$, $\Delta C2_{measured}$, $\Delta C3_{measured}$ and $\Delta C4_{measured}$ in capacitance of the sensor, and substituting the measured absolute changes in the updated relational expression of the force received by the sensor and the capacitance of the sensor, to obtain three components $Fx_{-measured}$, $Fy_{-measured}$, and $Fz_{-measured}$ of the unknown test force $F_{measured}$.

As compared with the prior art, the three-dimensional force flexible tactile sensor of the present invention has the following beneficial effects:

1. In order to enable the flexible sensor to achieve more functions, the present invention proposes a flexible porous elastomer-based three-dimensional force capacitive (PDiF) sensor and a decoupling method thereof by introducing porous elastomer as the dielectric layer. The sensor is composed of electrode layers and a porous elastic layer. Due to the cooperation of the electrodes which are equivalent to multiple parallel plate capacitors, the sensor of the present invention not only can detect normal mechanical load, but also can measure the force tangent to the surface of the sensor, thereby realizing the detection of the three-dimensional force.

2. In the present invention, the porous elastic layer is used as the dielectric layer, and its porous structure reduces the Young's modulus of the solid elastomer and increases the effective dielectric constant under compression, thereby improving the device sensitivity.

3. In the present invention, the normal and tangential loads produce a synergistic effect on the porous layer, thereby improving the nonlinear relationship between the capacitance output and the amplitude of the three-dimensional contact force.

Furthermore, the decoupling method for the three-dimensional force flexible tactile sensor of the present invention can realize three-dimensional force decoupling analysis, with high computational efficiency and accurate results.

BRIEF DESCRIPTION OF THE DRAWINGS

FIG. 1 illustrates a schematic structural diagram and principle diagram of the present invention, where (a) is a schematic structural diagram of a PDiF sensor, and (b) a schematic cross-sectional view of the sensor under the action of a normal force and a tangential force;

FIG. 2.2 illustrates a flowchart of preparation of a solution of a porous elastomer and a flowchart of assembly of the sensor, including the following steps: (a) preparing an SLD solution, (b) mixing the SLD solution respectively with two components Ecoflex A and B at a mass ratio of 1:1, (c) preparing an ECOFLX solution, (d-e) pouring and filling the Ecoflex mixture into a rectangular annular cavity, (f) covering the Ecoflex solution with a top electrode layer, and (g) curing the Ecoflex solution and removing the U-shaped acrylic mold;

DETAILED DESCRIPTION OF THE PREFERRED EMBODIMENTS

Figure 2:
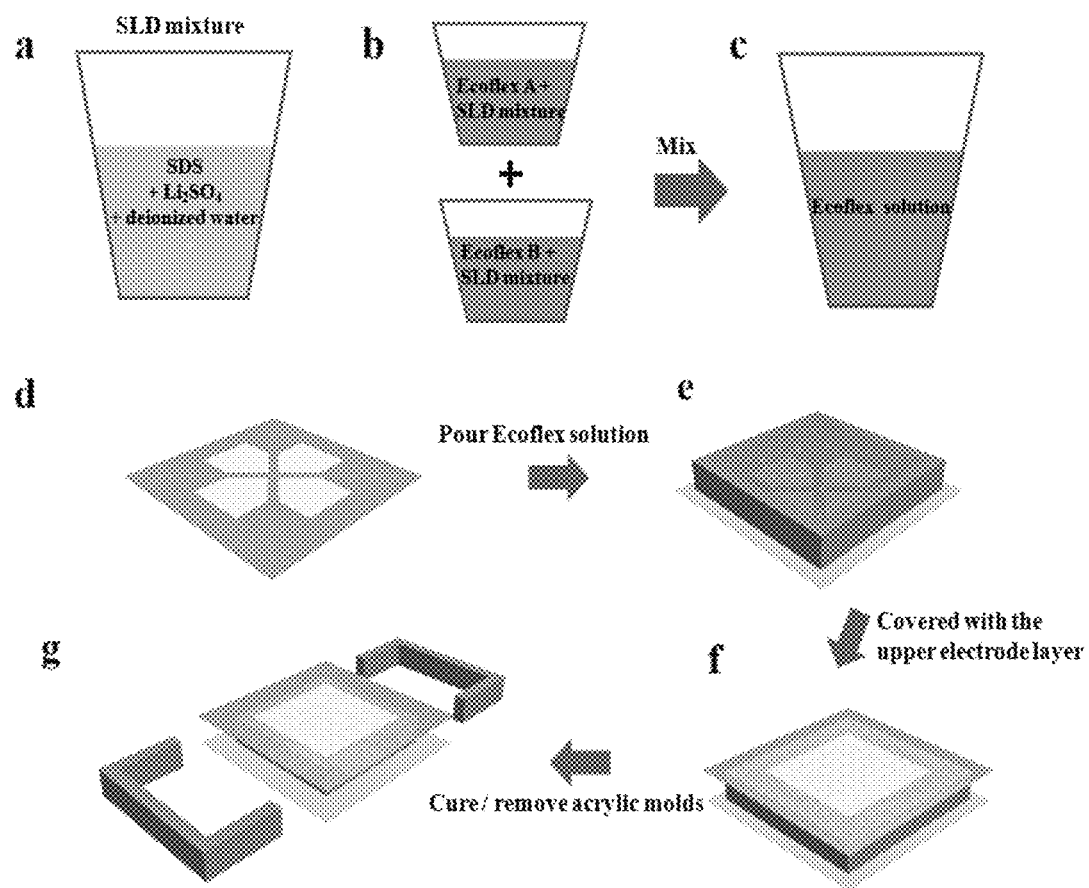
FIG. 2.1 is a flowchart of electrode preparation, including the following steps: (a) laminating a layer of adhesive tape on a cotton cloth, (b) laser cutting the adhesive tape layer to obtain a desired pattern, (c) applying a silver paste on the surface of a substrate, (d) scraping the silver paste into the pattern of the adhesive tape layer, and (e) curing the silver paste and tearing off the remaining adhesive tape on the substrate.

The present invention will be further described below in conjunction with the accompanying drawings and specific embodiments, so that those skilled in the art can better understand and implement the present invention, but the embodiments described are not intended to limit the present invention.

Referring to FIG. 1, the invention discloses a three-dimensional force flexible tactile sensor, including a first flexible layer, a porous elastic layer and a second flexible layer which are arranged in sequence. The first flexible layer is provided with a plurality of first electrodes. The second flexible layer is provided with a second electrode. The first electrodes and the second electrode are both clung to the porous elastic layer. The first flexible layer is fabric, plastic or polymer film. Four first electrodes may be provided. The porous elastic layer can be a flexible polymer material with pores therein, such as PDMS, Ecoflex, etc. A plurality of first electrodes and a second electrode form a capacitance unit. When the sensor is subjected to three-dimensional pressure, the magnitude and direction of the three-dimensional pressure can be calculated by measuring the capacitance value of each capacitance unit.

Referring to FIG. 1a, a cross-sectional view is used to illustrate the working principle of the PDiF sensor. The first flexible layer includes four independent electrodes, and the bottom second flexible layer uses a large rectangular common electrode.

The first flexible layer and the second flexible layer are separated by a porous elastic layer. In this implementation method, four parallel plate capacitor units are formed in the overlap area between the top and bottom electrodes. The initial capacitance ($C_0$) in each unit follows the following expression:

$$C_0 = \frac{\varepsilon_0 \times \varepsilon_r \times A_e}{d} \tag{1}$$

where $\varepsilon_0$ is the vacuum dielectric constant, $\varepsilon_r$ is the effective relative dielectric constant of the porous dielectric material, and $A_e$ and d are the overlapping area and distance of the upper and lower electrodes, respectively.

As shown in FIG. 1b, when the sensor receives a normal force ($F_z$), the dielectric layer deforms along the z-axis, and the distance (d) between the upper and lower electrode plates decreases, causing the capacitance to increase. In addition, the mechanical compression of the dielectric layer causes the pores to close, and the relative dielectric constant ($\varepsilon_r$) of the dielectric layer increases to further increase the capacitance change. When the sensor is subjected to a tangential force in the x-axis ($F_x$) or y-axis ($F_y$) direction, the elastic deformation changes the overlap area ($A_e$) of the top electrode and the bottom electrode along the force loading direction, causing the corresponding capacitance to change in this direction.

The present invention further provides a method for preparing the above three-dimensional force flexible tactile sensor, including the following steps:
Step S1, preparing a plurality of first electrodes on the first flexible layer to obtain a first electrode/flexible composite layer; preparing a second electrode on the second flexible layer to obtain a second electrode/flexible composite layer.

The preparing a plurality of first electrodes on the first flexible layer to obtain a first electrode/flexible composite layer includes the following steps:
S11, adhering an adhesive layer to one side of the first flexible layer, and etching the adhesive layer to obtain a receiving groove;
S12, filling an electrically conductive slurry in the receiving groove, and heating to solidify the electrically conductive slurry, where the electrically conductive slurry is a conductive silver paste or conductive polymer; and
S13, removing the adhesive layer to obtain the first electrode/flexible composite layer.

Specifically, as shown in FIG. 2.1a, an adhesive tape (50 µm thick, 3M) covers on a 150 µm cotton cloth (the base material can be fabric, plastic, polymer film, etc.), a predesigned geometric pattern is obtained using a photolithography machine (VLS 2.30, Universal Laser), and then the patterned area is peeled off, with the remaining part of the adhesive tape being used as a mask (FIG. 2.1b). An electrically conductive silver paste with a volume resistivity of 100 mΩ·mm is coated on the surface of the cotton/adhesive tape (FIG. 2.1c). Then, a scraper is used to flatten the silver paste so that the height of the silver paste is level with that of the adhesive tape (FIG. 2.1d), The electrode material can be pure metal, conductive silver paste, conductive polymer, etc., or a conductive tape can be directly cut into the required pattern and directly adhered to the base material. The substrate is heated using a heat gun (SAIKE 852D) with a power of 100 W for 20 s. During this process, the silver paste is completely dried. Then the remaining adhesive tape on the surface of the cotton cloth is removed (FIG. 2.1e). Thus, the fabrication of a patterned electrode is complete.

Step S2. preparing a solution of a porous elastomer. This step specifically includes the following steps:
S21, mixing sodium dodecylsulfate and lithium sulfate into deionized water to obtain a mixture; and
S22, mixing the mixture with a high molecular polymer to obtain the solution of the porous elastomer.

Specifically, first, sodium dodecylsulfate (SDS, BBI) and lithium sulfate ($Li_2SO_4$, ALDRICH) are mixed into deionized (DI) water at a mass ratio of 1:20:100 (SDS:$Li_2SO_4$:DI), and then shaken in a vortex oscillator (VORTEX-5, Kylin-Bell) for 20 minutes to form an SDS/$Li_2SO_4$/DI (SLD) mixture (FIG. 2.2a). Then the mixture is mixed with a high molecular polymer, such as PDMS, Ecoflex, etc. Here, Ecoflex-0030 is selected. The prepared mixture is respectively added to Part A and Part B of Ecoflex-0030 (SMOOTH-ON) (FIG. 2.2b). The specific operation is as follows. The mixture is added to Part A or Part B of Ecoflex at a mass ratio of 1:1, and the two separated solutions are manually stirred for 5 minutes. Then the two solutions are placed in a beaker at a mass ratio of 1:1, and stirred for 5 minutes. During this period, the deionized water is evenly dispersed in the mixture. The mixture of SLD, Part A and Part B of Ecoflex is called Ecoflex solution (FIG. 2.2c), and is evacuated in the vacuum chamber for 15 minutes.

Step S3. By using the second electrode/flexible composite layer as a substrate, pouring the solution of the porous elastomer on the second electrode/flexible composite layer, and covering with the first electrode/flexible composite layer.

In the present invention, a mold is further provided. The mold includes a first sub-mold and a second sub-mold, and the first sub-mold cooperates with the second sub-mold to form a cavity. The mold is placed on the second electrode/flexible composite layer, the cavity of the mold is filled with the solution of the porous elastomer, and then covered with the first electrode/flexible composite layer.

Specifically, as shown in FIG. 1.2d, two U-shaped acrylic molds are placed on the surface of the bottom electrode to form a rectangular annular cavity. The Ecoflex solution is poured and filled into the rectangular annular cavity, and then covered with the upper electrode layer (FIG. 2.2e and FIG. 2.2f). The sample is cured at room temperature for half an hour, and then the acrylic molds are removed from the substrate (FIG. 2.2g).

Step S4. solidifying the solution of the porous elastomer between the first electrode/flexible composite layer and the second electrode/flexible composite layer by curing to obtain a flexible sensor.

Specifically, the entire device is allowed to stand at room temperature for three days, during which time the deionized water is completely evaporated, leaving a lot of pores in the elastomer.

In the present invention, the pores in the porous elastomer can also be formed by 3D printing, or by a template method or other processing methods. The pores in the elastomer can be irregular and randomly dispersed pores, or regular-shaped pores arranged in an orderly manner, with a pore size in the range of 1 μm to 1 mm.

The present invention further provides a decoupling method for the above three-dimensional force flexible tactile sensor, including the following steps:

constructing a relational expression of a force received by the sensor and capacitance of the sensor:

$$\begin{bmatrix} \Delta C_1/C_1^0 \\ \Delta C_2/C_2^0 \\ \Delta C_3/C_3^0 \\ \Delta C_4/C_4^0 \end{bmatrix} = A \begin{bmatrix} F_x & F_y & F_x^2 & F_y^2 & F_xF_z & F_yF_z \end{bmatrix}, \quad (2)$$

wherein $C_n^0$ is an initial capacitance value between one of the four first electrodes and the second electrode, $\Delta C_n$ is an absolute change of a corresponding capacitance unit, $F_x$, $F_y$, and $F_z$ are components of a three-dimensional force, and n=1, 2, 3, 4;

detecting the initial capacitance values $C_1^0$, $C_2^0$, $C_3^0$, and $C_4^0$ between the first electrodes and the second electrode;

applying a three-dimensional force F' to the sensor, and based on the components Fx', Fy', and Fz' of the three-dimensional force F' which are known, obtaining the absolute changes ΔC1', ΔC2', ΔC3' and ΔC4' of the capacitances formed by the first electrodes and the second electrode;

changing the magnitude and direction of the three-dimensional force F' to obtain m sets of sample data, wherein each set of sample data includes $F_x'$, $F_y'$, and $F_z'$ under the three-dimensional force and the absolute changes ΔC1', ΔC2', ΔC3' and ΔC4' in capacitance of the sensor;

fitting the m sets of sample data according to a least squares method to obtain a matrix coefficient A', to obtain an updated relational expression of the force received by the sensor and the capacitance of the sensor:

$$\begin{bmatrix} \Delta C_1/C_1^0 \\ \Delta C_2/C_2^0 \\ \Delta C_3/C_3^0 \\ \Delta C_4/C_4^0 \end{bmatrix} = A' \begin{bmatrix} F_x & F_y & F_x^2 & F_y^2 & F_xF_z & F_yF_z \end{bmatrix};$$

and applying an unknown test force $F_{measured}$ to the sensor, measuring absolute changes $\Delta C1_{measured}$, $\Delta C2_{measured}$, $\Delta C3_{measured}$ and $\Delta C4_{measured}$ in capacitance of the sensor, and substituting the measured absolute changes in the updated relational expression of the force received by the sensor and the capacitance of the sensor, to obtain three components $Fx_{-measured}$, $Fy_{-measured}$, and $Fz_{-measured}$ of the unknown test force $F_{measured}$.

Specifically, in this embodiment, m=167. The m=167 data sets are fitted according to a least squares method, to obtain a matrix coefficient A':

$$A' = \begin{bmatrix} 0 & 5 & 3.9 & 7.7 & 7.7 & 0 & 4.5 \\ 5 & 0 & 3.9 & 7.7 & 7.7 & 4.5 & 0 \\ 0 & -5 & 3.9 & 7.7 & 7.7 & 0 & -0.5 \\ -5 & 0 & 3.9 & 7.7 & 7.7 & -0.5 & 0 \end{bmatrix} \times 10^{-2} \quad (3)$$

Figure 3:
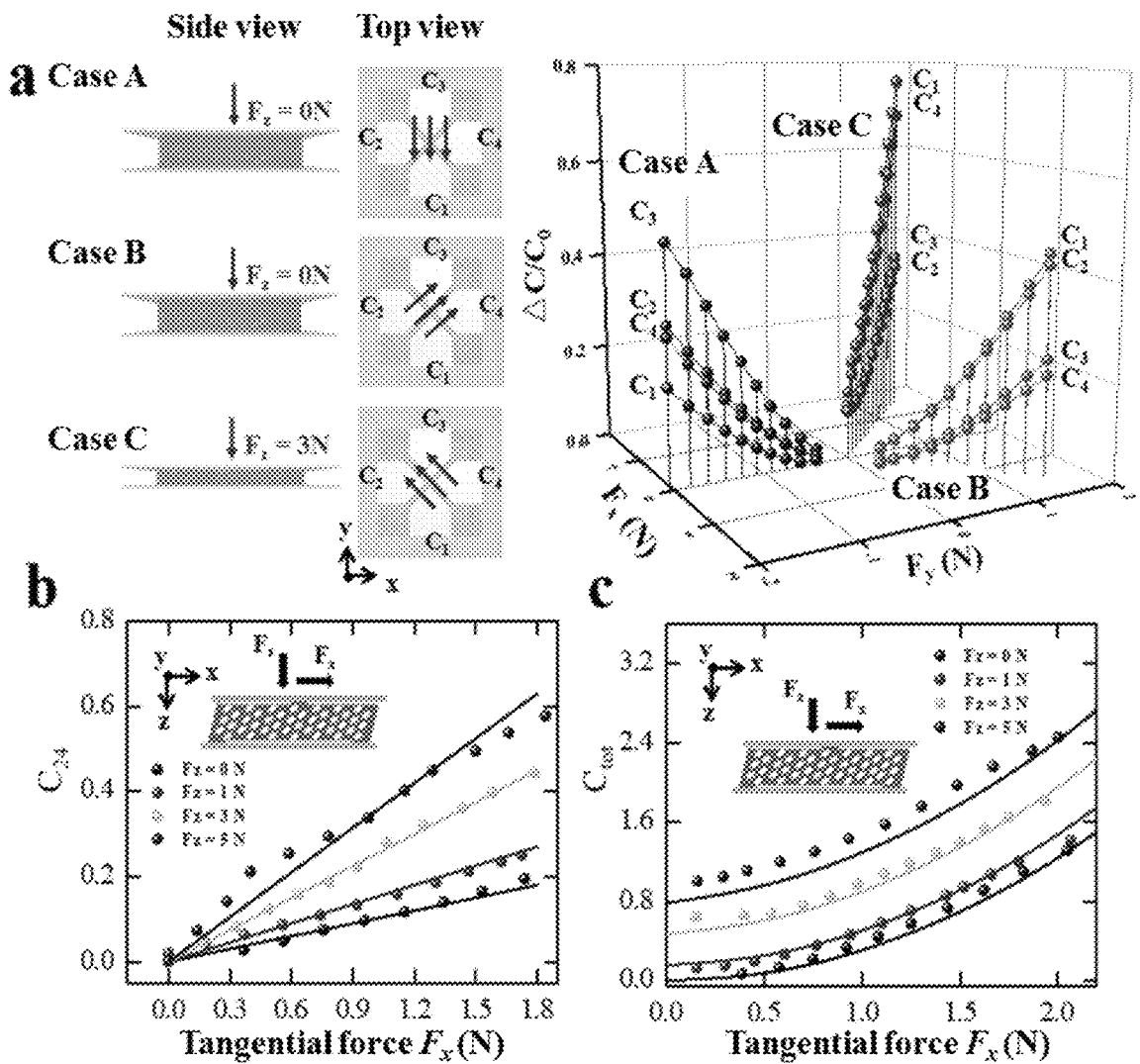
FIG. 3 is a test diagram of the sensor, where (a) shows schematic side views and top views when an external force having one force component (Fy, case A), two force components (Fx and Fy, case B) or three force components (Fx, Fy and Fz, case C) is applied to the sensor, and (b) and (c) show differential capacitance and total capacitance changes of four capacitance units of the sensor in response to the tangential load under the action of different normal forces.

FIG. 3 shows the comparison between the results obtained by fitting according to the least squares method (triangular points) and experimental data (round points). When the PDiF sensor is subjected to external loads in one, two, and three directions respectively, the experimental measured values (round points) and the fitted data (triangular points) of the relative capacitance changes of the four units C1, C2, C3, and C4 are compared.

With reference to equations (2)-(3), the force and capacitance can be predicted using the following equations:

$$C_{13} = (\sigma_t + m \times F_z) \times F_y \quad (4)$$

$$C_{24} = (\sigma_t + m \times F_z) \times F_x \quad (5)$$

$$C_{tot} = [\sigma_n + n \times (F_x + F_y)] \times F_z + p \times (F_x^2 + F_y^2) \quad (6)$$

where $\sigma_t = 0.10$, $\sigma_n = 0.157$, m=0.05, n=0.04, and p=0.31. $C_{13}$, $C_{24}$, and $C_{tot}$ are defined as:

$$C_{13} = \Delta C_1/C_1^0 - \Delta C_3/C_3^0 \quad (7)$$

$$C_{24} = \Delta C_2/C_2^0 - \Delta C_4/C_4^0 \quad (8)$$

$$C_{tot} = \Delta C_1/C_1^0 + \Delta C_2/\Delta C_2^0 + \Delta C_3/C_3^0 + \Delta C_4/C_4/C_4^0 \quad (9)$$

According to equations (4)-(6), it can be known that: (1) If only the tangential force is applied, $C_{13}$ and $C_{24}$ are proportional to $F_y$ and $F_x$ respectively; If only the normal force is applied, $C_{tot}$ has a linear relationship with $F_z$. This conclusion is similar to the conclusion of a three-dimensional force sensor using a solid elastomer as the dielectric layer. (2) $C_{tot}$ is largely influenced by the quadratic term of the tangential force in equation (6). It is caused by convolution of the change (increase or decrease) of the overlap area due to the existence of $F_x$ or $F_y$ and the increase of the dielectric constant of the dielectric material. (3) If the normal force and the tangential force are applied on the sensor at the same time, $C_{13}$, $C_{24}$ and $C_{tot}$ will all be affected by the joint effect of the two forces, i.e., $F_y \times F_z$ or $F_x \times F_z$. As shown in FIG. 3, when the PDiF sensor is subjected to external loads in one, two, and three directions respectively, the experimental measured values (blue points) and the fitted data (red points) of the relative capacitance changes of the four units C1, C2, C3, and C4 are compared. The results show that the root mean square error between the experimental data and the fitted data is within 3.3%. The decoupling method in the present invention features high calculation efficiency and accurate results.

The present invention has the following technical effects.

1. The present invention can detect the combined force, i.e., the invention can detect the normal force and the tangential force of the sensor at the same time, thereby detecting the three-dimensional force.

2. In conventional sensor decoupling methods, electrical signals are measured by applying single force components (i.e., $F_x$, $F_y$ or $F_z$), and then an equation is established to quantify the relationship between these individual force components and the electrical output. However, such a decoupling method cannot be applied to decoupling of a force having two or three components. In contrast, the decoupling method in this application can be applied to the decoupling of three-dimensional forces, with fast calculation speed and high precision.

3. The present invention provides useful clues for understanding how any component of a contact force affects the elastic porous structure and determining the capacitance output in a cooperative manner.

The technical solutions of the present invention will be further described in detail below with reference to specific embodiments.

(1) Capacitive Response to Three-Dimensional Force

FIG. 3a illustrates the relative capacitance changes ($\Delta C_n/C_n^0$, n=1, 2, 3 and 4) of the four sensing units when one force component ($F_y$, case A), two components ($F_x$ and $F_y$, case B) and three components ($F_x$, $F_y$ and $F_z$, case C) are applied to the PDiF sensor respectively. As shown in case A, when the sensor receives a force in the y-axis direction, the relative capacitances in the four cells all increase from the initial value (average $C_n^0$=3.3 pF), where the relative capacitance of each cell increases in a different range. When the tangential force $F_y$ increases from 0 to 2N, $C_1$ and $C_3$ increase by 21.1% and 46.3%, respectively. In the same force range, $C_2$ and $C_4$ increase by 31.0%. This is mainly due to two aspects: 1. Under the action of the tangential force, the pores become smaller due to stretching, resulting in an increase in the effective dielectric constant, thereby increasing the capacitance of each unit; 2. The tangential force changes the overlap area of the upper and lower electrodes. In this case, the overlap area of $C_3$ increases, and the overlap area of $C_1$ decreases. This ultimately results in a difference between capacitance changes of the two opposing units. In case B, when the PDiF sensor receives a force having two components ($F_x$ and $F_y$ are equal in magnitude), the capacitance changes of the four units can be divided into two groups according to the overlap area changes. When the tangential force increases from 0 to 2N, $C_1$ and $C_2$ (first group) increase by 40.5%, and $C_3$ and $C_4$ (second group) increase by 20.6%. In case C, when the sensor receives a normal force (3N) and a tangential force (0-1.5N) at the same time, the direction of the tangential force changes so that the capacitance changes of the four units are regrouped (the first group including $C_1$ and $C_4$, the second group including $C_2$ and $C_3$). In addition, compared with case B, the changes of the two groups increase by 10%. All results are consistent with the above rules.

FIG. 3b and FIG. 3c plot the responses of the differential capacitance $C_{24}$ ($C_{24}=\Delta C_2/C_2^0-\Delta C_4/C_4^0$) and total capacitance $C_{tot}$ ($C_{tot}=\Delta C_1/C_1^0+\Delta C_2/C_2^0+\Delta C_3/C_3^0+\Delta C_4/C_4^0$) of the sensor with respect to the normal force ($F_z$) and tangential force ($F_x$ or $F_y$). The differential capacitance $C_{24}$ presents a linear response to the tangential load ($F_x$) under a constant normal force (FIG. 3b). As the normal load increases to 5N, the tangential sensitivity $\sigma_t$ ($C_{24}/F_x$) increases from $0.12 N^{-1}$ to $0.34 N^{-1}$. On the other hand, the total capacitance change $C_{tot}$ of the four units is jointly controlled by $F_z$ and $F_x$, which indicates that the two force components have a synergistic effect on the four capacitors. As shown in FIG. 3c, when $F_z$ remains unchanged, $C_{tot}$ has a nonlinear relationship with $F_x$. In addition, under a tangential load of 2N, as $F_z$ increases from 0 to 5 N, $C_{tot}$ increases from 1.3 to 2.5.

(2) Comparison of Solid and Porous Elastomers

As shown by the expression 1, the capacitance value of a parallel plate capacitor is determined by the distance (d) between the electrodes, the total overlap area ($A_e$) and the effective dielectric constant ($\varepsilon_r$) of the porous dielectric layer. In the design of the PDiF sensor, the presence of a porous structure in the elastomer reduces the rigidity of the material. Therefore, compared with a solid elastomer, this material will undergo a larger deformation under the same external load. In addition, under the action of external pressure, the pores are gradually closed, and the air content in the elastomer decreases, resulting in an effective increase in the relative dielectric constant $\varepsilon_r$.

Figure 4:
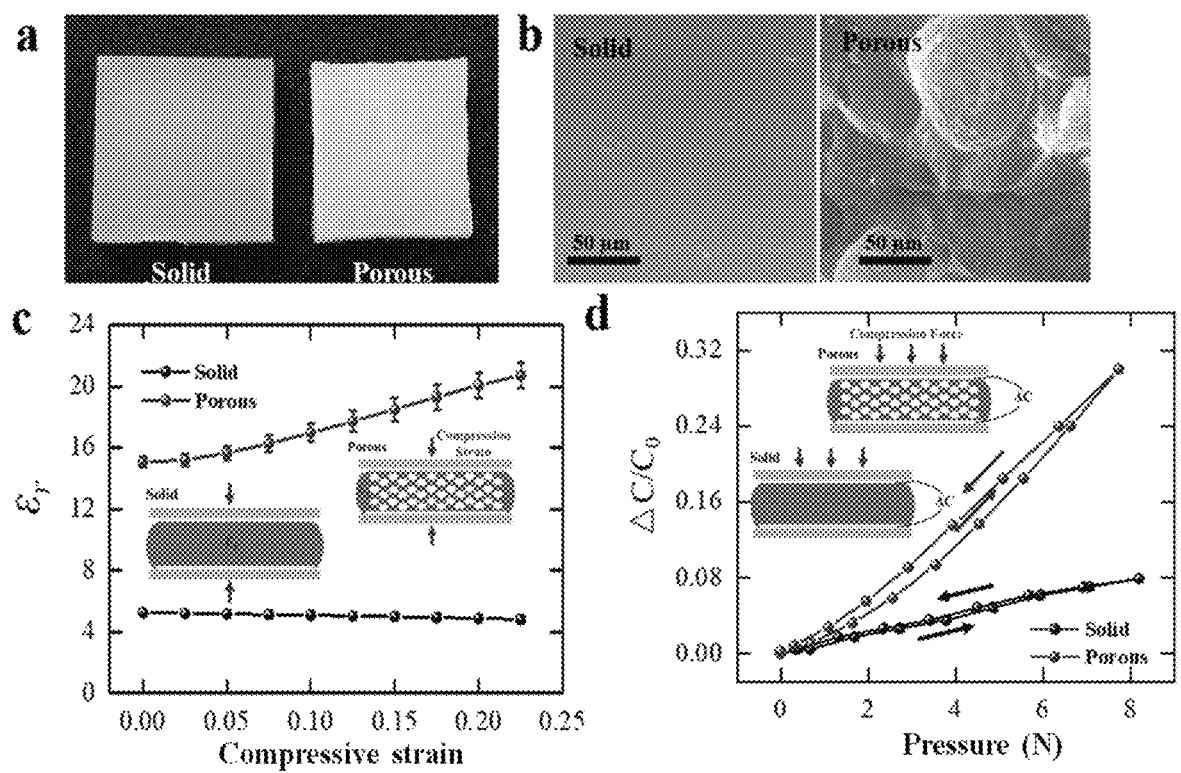
FIG. 4 is a comparison diagram of a solid elastic layer and a porous elastic layer, where (a) shows photos of the two, (b) is an electron microscope image of the two, (c) shows the change of the dielectric constants of two samples with mechanical compression, and (d) shows relative capacitance changes of the two samples under the action of a normal load.

Here, the dielectric and mechanical properties of porous and solid elastomer materials are compared through experiments. FIG. 4a and FIG. 4b respectively show photographs and electron microscope images of the morphologies of samples having and not having a porous elastomer. FIG. 4c shows the comparison of the changes of the dielectric constants of the two samples with mechanical compression. The effective dielectric constant of the solid elastomer is maintained at about 5 over the compression range, while the dielectric constant of the porous elastomer is increased by 35.58%. This is largely due to the closure of the pores, which drives air out of the elastomer and increases the overall dielectric constant. The presence of the porous structure helps increase the capacitance change under compression load. As shown in FIG. 4d, the relative capacitance change of the porous elastomer sensor under compression load is 2.9 times that of the solid elastomer.

(3) Detection Limit, Repeatability and Response/Recovery Time

Figure 5:
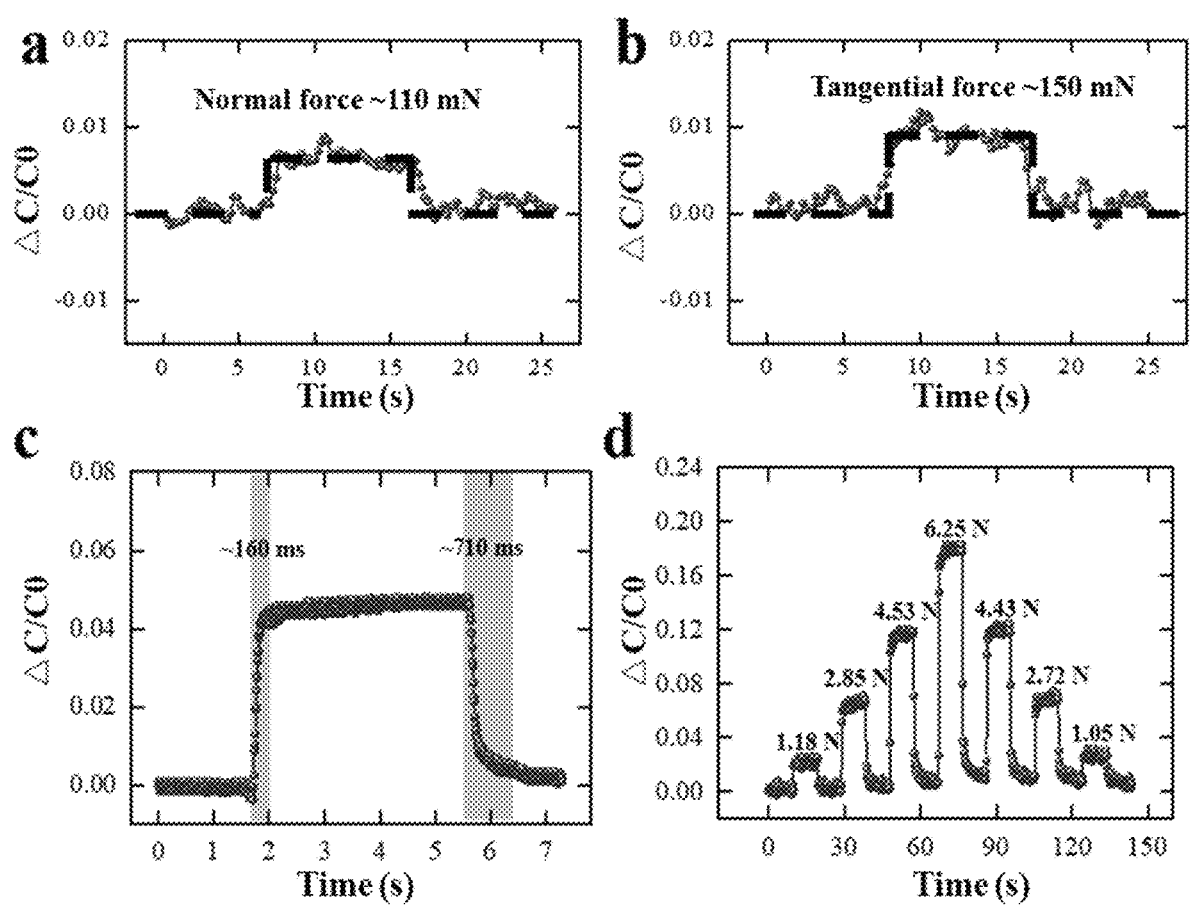
FIG. 5 is a schematic view of detection by a sensor of the present invention, wherein (a) is the minimum detectable force in the normal direction, (b) is the minimum detectable force in the tangential direction, (c) is a schematic diagram of the corresponding speed and recovery time, and (d) is a schematic diagram of the time-resolved response of the sensor for dynamic mechanical loads of 0-6.3 N.

The minimum detectable force in the normal and tangential directions is determined through time-resolved experiments. The relative capacitance change of a single sensing unit at a sampling frequency of 5 Hz is recorded (FIG. 5a and FIG. 5b). It is measured that when the normal force is 110 mN and the tangential force is 150 mN, the capacitance changes are 0.85% and 0.91%, respectively. By analyzing the falling edge and rising edge of the capacitance output curve, it can be seen that under a normal load of 1.17N, the response and recovery time are approximately 0.16 s and 0.71 s, respectively (FIG. 5c). In addition, the mechanical repeatability is also studied by applying different mechanical loads (from 0 to 6.3 N) in the normal direction. For all mechanical loads within this range, the sensor can sensitively respond to dynamic loads and return to its original value (FIG. 5d). The results show that the sensor of the present invention has excellent repeatability within the applied force range.

The above-described embodiments are merely preferred embodiments for the purpose of fully illustrating the present invention, and the scope of the present invention is not limited thereto. Equivalent substitutions or modifications can be made by those skilled in the art based on the present invention, which are within the scope of the present invention as defined by the claims. The scope of the present invention is defined by the appended claims.

What is claimed is:

1. A three-dimensional force flexible tactile sensor, comprising a first flexible layer, a porous elastic layer and a second flexible layer which are arranged in sequence,
   wherein the first flexible layer comprises a first flexible substrate with a plurality of first electrodes, the second flexible layer comprises a second flexible substrate with a second electrode, and the first electrodes and the second electrode are both clung to the porous elastic layer, and
   wherein the porous elastic layer is made of a flexible polymer material.

2. The three-dimensional force flexible tactile sensor according to claim 1, wherein the flexible polymer material is silicone rubber.

3. The three-dimensional force flexible tactile sensor according to claim 1, wherein the first flexible layer is fabric, plastic or polymer film.

4. The three-dimensional force flexible tactile sensor according to claim 1, wherein four first electrodes are provided.

5. A decoupling method for a three-dimensional force flexible tactile sensor according to claim 4, comprising steps of:

constructing a relational expression of a force received by the sensor and capacitance of the sensor:

$$\begin{bmatrix} \Delta C_1/C_1^0 \\ \Delta C_2/C_2^0 \\ \Delta C_3/C_3^0 \\ \Delta C_4/C_4^0 \end{bmatrix} = A\begin{bmatrix} F_x & F_y & F_x^2 & F_y^2 & F_xF_z & F_yF_z \end{bmatrix},$$

wherein $C_n^0$ is an initial capacitance value between one of the four first electrodes and the second electrode, $\Delta C_n$ is an absolute change of a corresponding capacitance unit, $F_x$, $F_y$, and $F_z$ are components of a three-dimensional force, and n=1, 2, 3, 4;

detecting the initial capacitance values $C_1^0$, $C_2^0$, $C_3^0$, and $C_4^0$ between the first electrodes and the second electrode;

applying a three-dimensional force F' to the sensor, and based on the components $F_x'$, $F_y'$, and $F_z'$ of the three-dimensional force F' which are known, obtaining the absolute changes $\Delta C1'$, $\Delta C2'$, $\Delta C3'$ and $\Delta C4'$ of the capacitances formed by the first electrodes and the second electrode;

changing the magnitude and direction of the three-dimensional force F' to obtain m sets of sample data, wherein each set of sample data comprises $F_x'$, $F_y'$, and $F_z'$ under the three-dimensional force and the absolute changes $\Delta C1'$, $\Delta C2'$, $\Delta C3'$ and $\Delta C4'$ in capacitance of the sensor;

fitting the m sets of sample data according to a least squares method to obtain a matrix coefficient A', and obtain an updated relational expression of the force received by the sensor and the capacitance of the sensor $$\begin{bmatrix} \Delta C_1/C_1^0 \\ \Delta C_2/C_2^0 \\ \Delta C_3/C_3^0 \\ \Delta C_4/C_4^0 \end{bmatrix} = A'\begin{bmatrix} F_x & F_y & F_x^2 & F_y^2 & F_xF_z & F_yF_z \end{bmatrix};$$

and applying an unknown test force $F_{measured}$ to the sensor, measuring absolute changes $\Delta C1_{measured}$, $\Delta C2_{measured}$, $\Delta C3_{measured}$ and $\Delta C4_{measured}$ in capacitance of the sensor, and substituting the measured absolute changes in the updated relational expression of the force received by the sensor and the capacitance of the sensor, to obtain three components $F_{x\text{-}measured}$, $F_{y\text{-}measured}$, and $F_{z\text{-}measured}$ of the unknown test force $F_{measured}$.

6. A method for fabricating preparing a three-dimensional force flexible tactile sensor, comprising steps of:

S1, preparing a plurality of first electrodes on a first flexible layer to obtain a first electrode/flexible composite layer; preparing a second electrode on a second flexible layer to obtain a second electrode/flexible composite layer;

S2, preparing a solution of a porous elastomer;

S3, by using the second electrode/flexible composite layer as a substrate, pouring the solution of the porous elastomer on the second electrode/flexible composite layer, and covering with the first electrode/flexible composite layer; and S4, solidifying the solution of the porous elastomer between the first electrode/flexible composite layer and the second electrode/flexible composite layer by curing to obtain a flexible sensor.

7. The method for preparing the three-dimensional force flexible tactile sensor according to claim 6, wherein in the step S1, the preparing a plurality of first electrodes on the first flexible layer to obtain a first electrode/flexible composite layer comprises steps of:

adhering an adhesive layer to one side of the first flexible layer, and etching the adhesive layer to obtain at least one receiving groove;

filling an electrically conductive slurry in the receiving groove, and heating to solidify the electrically conductive slurry; and removing the adhesive layer to obtain the first electrode/flexible composite layer.

8. The method for preparing the three-dimensional force flexible tactile sensor according to claim 7, wherein the adhesive layer is etched to obtain at least three receiving grooves.

9. The method for preparing the three-dimensional force flexible tactile sensor according to claim 8, wherein the adhesive layer is etched to obtain four receiving grooves.

10. The method for preparing the three-dimensional force flexible tactile sensor according to claim 7, wherein the electrically conductive slurry is a conductive silver paste or conductive polymer.

11. The method for preparing the three-dimensional force flexible tactile sensor according to claim 6, wherein in the step S2, the preparing a solution of a porous elastomer comprises steps of:

mixing sodium dodecylsulfate and lithium sulfate into deionized water to obtain a mixture; and mixing the mixture with a high molecular polymer to obtain the solution of the porous elastomer.

12. The method for preparing the three-dimensional force flexible tactile sensor according to claim 6, wherein a mold is further provided, the mold comprises a first sub-mold and a second sub-mold, the first sub-mold cooperates with the second sub-mold to form a cavity, and the step S3 comprises:

placing the mold on the second electrode/flexible composite layer, filling the cavity of the mold with the solution of the porous elastomer, and then covering with the first electrode/flexible composite layer.

* * * * *